(12) United States Patent
Johnson et al.

(10) Patent No.: US 8,484,137 B2
(45) Date of Patent: Jul. 9, 2013

(54) TELEMETRY SYSTEM

(75) Inventors: Matthew Johnson, Spokane, WA (US); Christopher L. Osterloh, Waseca, MN (US); Mark K. Cornwall, Spokane, WA (US); Barry Cahill-O'Brien, Spokane, WA (US); James P. Ogle, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 12/887,856

(22) Filed: Sep. 22, 2010

(65) Prior Publication Data

US 2011/0078093 A1 Mar. 31, 2011

Related U.S. Application Data

(60) Provisional application No. 61/245,751, filed on Sep. 25, 2009.

(51) Int. Cl.
*G01R 11/56* (2006.01)
*G06Q 50/06* (2012.01)

(52) U.S. Cl.
CPC ..................................... *G06Q 50/06* (2013.01)
USPC ..................................... 705/412; 340/870.01

(58) Field of Classification Search
None
See application file for complete search history.

(56) References Cited

U.S. PATENT DOCUMENTS

| | | | |
|---|---|---|---|
| 3,815,126 A | 6/1974 | Batz | |
| 4,238,825 A | 12/1980 | Geery | |
| 5,801,643 A | 9/1998 | Williams et al. | |
| 6,088,659 A | 7/2000 | Kelley et al. | |
| 6,366,217 B1 | 4/2002 | Cunningham et al. | |
| 7,027,957 B2 | 4/2006 | Fourie et al. | |
| 7,058,523 B2 | 6/2006 | Ramirez | |
| 7,068,052 B2 | 6/2006 | Hilleary et al. | |
| 7,069,161 B2 | 6/2006 | Gristina et al. | |
| 7,298,288 B2 | 11/2007 | Nagy et al. | |
| 7,337,078 B2 | 2/2008 | Bond et al. | |
| 7,661,306 B2 | 2/2010 | Crottie | |
| 8,054,199 B2 | 11/2011 | Addy | |
| 2001/0010032 A1 | 7/2001 | Ehlers et al. | |
| 2002/0030604 A1 | 3/2002 | Chance et al. | |
| 2002/0039069 A1 | 4/2002 | Chance et al. | |
| 2006/0031180 A1 | 2/2006 | Tamarkin et al. | |
| 2008/0177678 A1 | 7/2008 | Di Martini et al. | |
| 2008/0180275 A1 | 7/2008 | Whitaker et al. | |
| 2008/0219210 A1 | 9/2008 | Shuey et al. | |
| 2009/0111520 A1* | 4/2009 | Ring | 455/557 |
| 2010/0036939 A1 | 2/2010 | Yang et al. | |

OTHER PUBLICATIONS

PCT International Search Report for PCT International Application No. PCT/US2010/049820 dated Nov. 15, 2010.

(Continued)

*Primary Examiner* — Faris Almatrahi
(74) *Attorney, Agent, or Firm* — Dority & Manning, P.A.

(57) ABSTRACT

Disclosed are apparatus and related methodologies for transmitting data in a gas AMI network. Data may be transmitted bi-directionally between selected endpoint devices and data collection devices to central or head end equipment. Transmitted data may include parameter updating data for selected endpoint devices, and collected data from selected endpoint devices. Endpoint physical area conditions may be monitored for selected of the endpoint devices including monitoring for and reporting of physical changes in the area surrounding cathodic protection systems. The present concepts may be extended to implementation in conjunction with water and electricity metering environments.

20 Claims, 1 Drawing Sheet

OTHER PUBLICATIONS

PCT Written Opinion of the International Searching Authority for PCT International Application No. PCT/US2010/049820 dated Nov. 15, 2010.
PCT International Search Report for PCT International Application No. PCT/US2010/050340 dated Nov. 26, 2010.
PCT Written Opinion of the International Searching Authority for PCT International Application No. PCT/US2010/050340 dated Nov. 26, 2010.
David J. Southern P.E., Product Development Manager, FreeWave Technologies, Inc., "Operators Extend SCADA Investment to Vital Cathodic Protection", pp. 16-17 of *Remote Site & Equipment Management Magazine*, Jun./Jul. 2008.
USPTO Non-Final Office Action issued Dec. 1, 2011 for U.S. Appl. No. 12/890,786.
Notice of Acceptance dated Mar. 5, 2013 for Australian Patent Application No. 2010298382.
U.S. Appl. No. 12/889,610 Office Action issued Dec. 26, 2012.

* cited by examiner

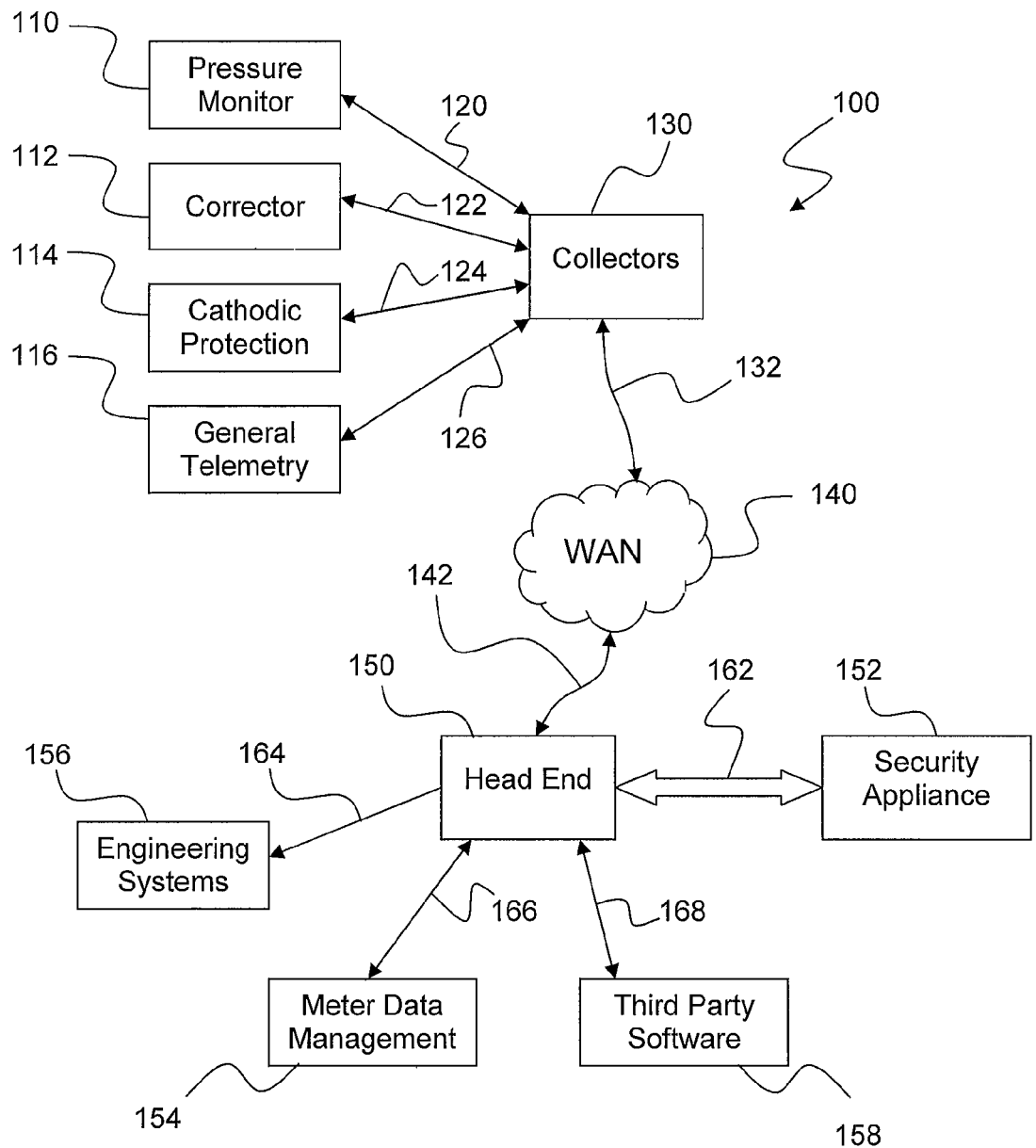

TELEMETRY SYSTEM

PRIORITY CLAIM

This application claims the benefit of previously filed U.S. Provisional Patent Application entitled "TELEMETRY SYSTEM," assigned U.S. Ser. No. 61/245,751, filed Sep. 25, 2009, and which is incorporated herein by reference for all purposes.

FIELD OF THE INVENTION

The present subject matter relates to telemetry systems. More specifically, the present subject matter relates to telemetry systems and methodologies for transmitting data related to utility usage between user locations and a central and/or data collection facility.

BACKGROUND OF THE INVENTION

For gas utilities, there are several system integrity activities that are labor intensive and expensive to perform. For example, pressure recorders have paper charts that either need to be replaced each week or the pressure values need to be downloaded to a portable computer. Cathodic protection systems are used to protect against (i.e., prevent) pipe deterioration. The integrity of the system must be monitored by making voltage measurements at many test points throughout the gas distribution system.

Correctors are used on high volume, e.g., commercial, meters, and contain many metering parameters that are not typically brought back to an associated utility through an Automated Meter Reading (AMR) network. Temperature is one parameter of known particular interest since there is a relationship between temperature and pressure that can alter the accuracy of the measurement of the gas consumed. Not knowing the temperature at the meter can lead to either of an under or over accounting for the gas sold (i.e., delivered). With a higher resolution picture of pertinent temperature data, not only at a corrector, but at many points throughout the service territory, an associated utility can take micro-climactic conditions into its accounting of, and billing for, gas.

Further, there are general telemetry measurements that cannot be economically transported back to an associated gas utility since many of the measurement sites lack power for radio systems, and since cellular modems require large batteries that need frequent replacement.

United States Patent Application Publication 2008/0177678 A1 to DiMartini et al. describes a method of communicating between a utility and its customer locations. United States Patent Application Publication 2006/0031180 A1 to Tamarkin et al. describes integrated metrology systems and information and control apparatus for interaction with integrated metrology systems. U.S. Pat. No. 7,069,161 B2 to Gristina et al. describes a system for managing resource infrastructure and resource consumption in real time. United States Patent Application Publication 2001/0010032A1 to Ehlers et al. describes an energy management and building automation system including a local area network or home automation data bus where each load to be controlled is connected to the bus via a control module.

The complete disclosures of the herein referenced patent related publications are fully incorporated herein for all purposes.

While various implementations of telemetry systems have been developed, and while various integrated metrology systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology for carrying out utility measurements and other two-way communications over an Advanced Metering Infrastructure (AMI) are provided.

In an exemplary configuration, utility measurement data are carried over AMI networks by way of nodes and endpoints requiring very low power consumption.

In one of their simpler forms, battery powered endpoints are provided that eliminate the need for AC power at telemetry sites.

Another positive aspect of the present type of apparatus and methodology is that it significantly reduces the cost of monitoring utility consumption and customer location apparatus protective features. In exemplary configurations, monitoring of gas consumption by a consumer and monitoring of associated cathodic protection installations, among other adjunct data groups, is simplified.

In accordance with aspects of certain embodiments of the present subject matter, methodologies are provided to quickly identify faults in customer location cathodic protection apparatus.

In accordance with certain aspects of other embodiments of the present subject matter, methodologies have been developed to record the date and time of a change in cathodic protection apparatus to identify certain endpoint area construction activity that may have adversely impacted the cathodic protection apparatus.

One present exemplary embodiment relates to a telemetry system for transmitting data related to operational conditions and utility usage between user locations and a centralized data collection facility. Such a system preferably includes a plurality of endpoint devices, at least one telemetry device, a main communications network, at least one collector, and a head end processor. Preferably such plurality of endpoint devices are associated with respective locations of utility usage, for transmitting utility usage data associated with its respective location, while at least one telemetry device is respectively associated with selected of such endpoint devices, for monitoring for preselected operational conditions at such telemetry device and transmitting data related thereto. Further, such at least one collector is preferably provided for communications with such endpoint and telemetry devices and such main communications network; and the head end processor is for communications with such main communications network, such that utility usage data and operational conditions data are collected and communicated to such head end processor via such main communications network.

In exemplary variations of the foregoing telemetry system, a plurality of telemetry devices are further respectively associated with selected of such endpoint devices, for respectively monitoring for a plurality of preselected operational conditions at such endpoint device location and transmitting data related thereto.

In still other present embodiments of an exemplary telemetry system, such utility usage may comprise gas consumption; and at least selected of such telemetry devices may monitor at least one of temperature and pressure conditions at an associated endpoint device location. With such exemplary alternative arrangements, an associated gas utility can correct gas usage billing based on micro-climactic conditions at an associated endpoint device location.

In yet another present alternative telemetry system, at least selected of such telemetry devices may comprise voltage measurement devices for identifying faults in associated cathodic protection apparatus.

Other present variations include providing the exemplary head end processor with data management functionality, for storing and processing gas usage data.

Per yet additional alternatives, such main communications network comprises one of a WAN, a wireless network, and the internet; and in some present instances communications may comprise wireless bidirectional communications.

Another present exemplary embodiment may more particularly relate to a bidirectional gas AMI telemetry network for transmitting data related to operational conditions and gas usage between user locations and a centralized data collection facility. Such telemetry network may preferably comprise a plurality of endpoint devices for monitoring and transmitting gas usage data associated with its respective location; a plurality of telemetry devices, respectively associated with selected of such endpoint device locations, for monitoring at least one preselected physical condition at such telemetry device and transmitting data related thereto; a WAN; a plurality of data collection devices, for bidirectional communications with selected of such endpoint and telemetry devices and such WAN; and a centralized data collection facility in bidirectional communication with such WAN, for receiving and processing gas usage data and physical condition data.

In some present alternatives of the foregoing exemplary network, at least selected of such telemetry devices may comprise voltage measurement devices for identifying faults in associated cathodic protection apparatus, whereby such telemetry network may combine cost effective system integrity functionality with gas usage monitoring for gas utilities.

In other present exemplary alternatives, at least selected of such telemetry devices may monitor at least one of temperature and pressure conditions at such telemetry device, whereby an associated gas utility can adjust gas usage billing based on micro-climactic conditions.

Still further present alternatives include bidirectional communications of such data collection devices comprising wireless communications. Other present variations include providing such telemetry devices as battery operated. In yet other variations, such exemplary networks may further include meter data management means associated with such centralized data collection facility, for storing and processing data received via such telemetry system.

Another present exemplary variation of such present network may include providing selected of such telemetry devices as voltage measurement devices for identifying faults in a cathodic protection apparatus of an associated gas delivery system; providing selected of such telemetry devices to monitor temperature and pressure conditions at selected of such endpoint device locations, for use in adjusting gas usage billing based on micro-climactic conditions; providing bidirectional communications of such data collection devices as wireless communications; and further including in such telemetry network meter data management means associated with such centralized data collection facility, for storing and processing data received via such telemetry system, whereby usage data and gas delivery system integrity are efficiently monitored via an integrated system.

It should be understood by those of ordinary skill in the art, from the complete disclosure herewith, that the present subject matter equally relates both to apparatus and to corresponding and/or related methodology. One present exemplary method relates to a method for gathering data for utility measurements and data for operational conditions at utility usage points, comprising transmitting utility usage data from a plurality of endpoint devices associated with respective locations of utility usage; monitoring for preselected operational conditions at selected of such utility usage locations, and creating data for such monitored conditions; transmitting the utility usage data and monitored conditions data to at least one collector; and communicating such data to a head end processor via such collector and a main communications network. Advantageously, through practice of such present methodology, utility usage data and operational conditions data are collected and communicated to a central location for processing, to permit efficient monitoring of utility usage and associated conditions by a utility provider.

Some present methods may further include monitoring for a plurality of preselected operational conditions at selected utility usage locations and creating data related thereto.

In still other present alternative methodologies, the utility measurements may comprise monitoring gas consumption; the operational conditions may include at least one of temperature and pressure conditions at an associated gas consumption location; and central location processing may include correcting gas usage billing based on micro-climactic conditions at an associated gas consumption location.

Per other present alternative methods, data management may be conducted at the central location, for storing and processing gas usage data.

In other present alternatives, the utility measurements may comprise monitoring gas consumption; and the operational conditions may include voltage measurements for identifying faults in cathodic protection apparatus associated with a gas pipeline of a gas utility provider. In yet other variations, the main communications network may comprise one of a WAN, a wireless network, and the internet.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended FIGURE, in which:

FIG. 1 is a block diagram of an exemplary telemetry system constructed in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with telemetry apparatus and methodologies for carrying out utility measurements and other two-way communications over an Advanced Metering Infrastructure (AMI).

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference is made in detail to the presently preferred embodiments of the subject telemetry system. Referring now to the drawings, FIG. 1 illustrates an exemplary telemetry system generally 100 in accordance with the present subject matter. System 100 may include various exemplary telemetry endpoints 110, 112, 114, 116 located within, for example, a Gas AMI network, and which are read by network collectors 130. Telemetry endpoints may include, but are not limited to, a pressure monitor 110, a data corrector 112, cathodic protection apparatus 114, and general telemetry apparatus 116. Such exemplary telemetry endpoints 110, 112, 114, 116 may be connected for data transmission via transmission paths 120, 122, 124, 126, respectively, to collectors 130.

It should be appreciated that while transmission paths 120, 122, 124, 126 are presently illustrated as transmission lines, such is not a specific limitation of the present technology as data may be transmitted by any suitable technology, including via wired as well as wireless technology. In similar fashion, transmission paths 162, 164, 166, 168 (illustrated as variously coupling data between head end associated items) may also correspond to any suitable data transmission capable device. In accordance with present subject matter, the technology described herein is designed to reduce the operating costs associated with system integrity functions for gas utilities, and is thus not limited by the exemplary methodology and apparatus illustrated.

Those of ordinary skill in the art will appreciate that the illustration in FIG. 1 with respect to the network configuration is exemplary and that other components, for example, but not limited to, repeaters, may also be employed. It should be appreciated that while the present subject matter is described more specifically as directed to gas AMI networks, such is not a specific limitation of the disclosure as the present disclosure may be extended to water and electric networks.

Further, while the present communications system is described as a network, other and additional communication forms including the use of mobile data collection apparatus may be employed within the scope of the present disclosure. Still further, while the present disclosure describes the use of a WAN to transmit information among selected devices, such is illustrative only as other information exchange apparatus may be used to provide desired communications including, but not limited to, WANs, LANs, all varieties of wireless systems, and the Internet.

In accordance with present exemplary disclosure, information from such exemplary endpoints 110, 112, 114, 116 is processed in the collectors 130 and sent over a WAN 140 to the head end system 150 by way of exemplary transmission paths 132, 142. The head end system 150 may further process the endpoint reading and send that information to other systems. Analysis of data associated with a cathodic protection system may be analyzed by a security appliance generally 152. Long-term storage can, of course, be provided by, for example, a meter data management (MDM) system generally 154, not presently illustrated in detail. Such system 154 may also be considered as meter data management means associated with the head end or centralized data collection facility, for storing and processing data received via the telemetry system generally 100. With such arrangements, when incorporating the cathodic protection monitoring, advantageously usage data and gas delivery system integrity are efficiently monitored via an integrated system. For telemetry, there may be other systems that are not part of an AMR/AMI network, such as engineering systems 156 that monitor distribution system pressure, or software systems 158 provided by the manufacturer of the correctors 112 or other components monitored by the endpoints. Other systems, not presently illustrated, may also be included in system 100.

Endpoints 110, 112, 114, 116 "bubble-up" readings of the telemetry data periodically as needed for measurement resolution and network reliability. As described in U.S. Pat. No. 7,298,288 B2, assigned to the owner of the present technology, battery-powered endpoints have been designed to limit the power consumed in day-to-day operation. One well-known design feature is a bubble-up mode of operation, in which an endpoint "bubbles-up," or activates its transceiver to communicate or attempt to communicate with the AMR data collection system, according, for example, to a preset schedule. The time duration or period between bubble-up events may typically span seconds or minutes.

Endpoints 110, 112, 114, 116 may also contain alarm thresholds. Per the present subject matter, when those thresholds are exceeded, the associated endpoint will initiate an alarm to rapidly indicate an over/under threshold situation to the head end 150. Such alarms may take the form of special messages and may be sent at a higher frequency than normal transmissions to assure rapid and reliable delivery. Per present subject matter, parameters stored in collectors 130 may also be changed through the use of two-way commands from the system head end 150 down to the collectors.

Collectors 130 validate the readings from the endpoints 110, 112, 114, 116 and prioritize the uploading of data to the head end 150. Collectors 130 can also evaluate data from the endpoints 110, 112, 114, 116 and generate alarms as well.

At head end 150, the data is further validated, again alarms can be generated, and alarms and data are exported to an external system. Head end 150 can also accept requests from an external system, not presently illustrated, to send reconfiguration messages through the network to the endpoints 110, 112, 114, 116, all per the present subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A telemetry system for transmitting data related to operational conditions and utility usage between user locations and a centralized data collection facility, said system comprising:
   a plurality of endpoint devices associated with respective locations of utility usage, for transmitting utility usage data associated with its respective location;
   at least one telemetry device respectively associated with selected of said endpoint devices, for monitoring for preselected operational conditions at such telemetry device and transmitting data related thereto;
   a main communications network;
   at least one collector, for prioritization of said utility usage data and said operational conditions data and for communications with said endpoint and telemetry devices and said main communications network; and
   a head end processor for communications with said main communications network, such that utility usage data and operational conditions data are collected, prioritized for communication to said head end processor, and communicated to said head end processor by said collector via said main communications network.

2. A telemetry system as in claim 1, further including a plurality of telemetry devices respectively associated with selected of said endpoint devices, for respectively monitoring for a plurality of preselected operational conditions at such endpoint device location and transmitting data related thereto.

3. A telemetry system as in claim 2, wherein:
   said utility usage comprises gas consumption; and
   at least selected of said telemetry devices monitor at least one of temperature and pressure conditions at an associated endpoint device location, whereby an associated gas utility can correct gas usage billing based on micro-climactic conditions at an associated endpoint device location.

4. A telemetry system as in claim 3, wherein at least selected of said telemetry devices comprise voltage measurement devices for identifying faults in associated cathodic protection apparatus.

5. A telemetry system as in claim 3, wherein said head end processor further includes data management functionality, for storing and processing gas usage data.

6. A telemetry system as in claim 1, wherein said communications comprise wireless bidirectional communications.

7. A bidirectional gas AMI telemetry network for transmitting data related to operational conditions and gas usage between user locations and a centralized data collection facility, said telemetry network comprising:
   a plurality of endpoint devices for monitoring and transmitting gas usage data associated with its respective location;
   a plurality of telemetry devices, respectively associated with selected of said endpoint device locations, for monitoring at least one preselected physical condition at such telemetry device and transmitting data related thereto;
   a WAN;
   a plurality of data collection devices, for prioritization of said gas usage data and said physical condition data and for bidirectional communications with selected of said endpoint and telemetry devices and said WAN; and
   a centralized data collection facility in bidirectional communication with said WAN, for receiving and processing gas usage data and physical condition data.

8. A network as in claim 7, wherein at least selected of said telemetry devices comprise voltage measurement devices for identifying faults in associated cathodic protection apparatus, whereby said telemetry network combines cost effective system integrity functionality with gas usage monitoring for gas utilities.

9. A network as in claim 7, wherein at least selected of said telemetry devices monitor at least one of temperature and pressure conditions at such telemetry device, whereby an associated gas utility can adjust gas usage billing based on micro-climactic conditions.

10. A network as in claim 7, wherein said telemetry devices are battery operated.

11. A network as in claim 7, further including meter data management means associated with said centralized data collection facility, for storing and processing data received via said telemetry system.

12. A network as in claim 7, wherein:
   selected of said telemetry devices comprise voltage measurement devices for identifying faults in a cathodic protection apparatus of an associated gas delivery system;
   selected of said telemetry devices monitor temperature and pressure conditions at selected of said endpoint device locations, for use in adjusting gas usage billing based on micro-climactic conditions;
   said bidirectional communications of said data collection devices comprise wireless communications; and
   said telemetry network further includes meter data management means associated with said centralized data collection facility, for storing and processing data received via said telemetry system, whereby usage data and gas delivery system integrity are efficiently monitored via an integrated system.

13. A method for gathering data for utility measurements and data for operational conditions at utility usage points, comprising:
   transmitting utility usage data from a plurality of endpoint devices associated with respective locations of utility usage;
   monitoring for preselected operational conditions at selected of such utility usage locations, and creating data for such monitored conditions;
   transmitting the utility usage data and monitored conditions data to at least one collector;
   prioritizing, at the collector, such data for uploading; and
   uploading such data to a head end processor via such collector and a main communications network according to the priority, such that utility usage data and operational conditions data are collected, prioritized for uploading, and uploaded to a central location for processing, to permit efficient monitoring of utility usage and associated conditions by a utility provider.

14. A method as in claim 13, further including monitoring for a plurality of preselected operational conditions at selected utility usage locations and creating data related thereto.

15. A method as in claim 13, wherein:
   the utility measurements comprise monitoring gas consumption;
   the operational conditions include at least one of temperature and pressure conditions at an associated gas consumption location; and central location processing includes correcting gas usage billing based on micro-climactic conditions at an associated gas consumption location.

16. A method as in claim 13, further including conducting data management at the central location, for storing and processing gas usage data.

17. A method as in claim 13, wherein:
the utility measurements comprise monitoring gas consumption; and
the operational conditions include voltage measurements for identifying faults in cathodic protection apparatus associated with a gas pipeline of a gas utility provider.

18. A telemetry system as in claim 1, wherein said at least one telemetry device comprises a data corrector configured to correct the utility usage data prior to the transmission of the utility usage data to the at least one collector.

19. A network as in claim 7, further comprising a plurality of correctors respectively associated with the plurality of endpoint devices, wherein each corrector corrects the gas usage data of the associated endpoint device prior to the associated endpoint device transmitting the gas usage data to the associated data collection device.

20. A method as in claim 13, further comprising correcting the utility usage data prior to transmitting the utility usage data and monitored conditions data to the at least one collector.

* * * * *